(Model.)

2 Sheets—Sheet 1.

S. STURGIS.
STREET SWEEPING MACHINE.

No. 418,143.

Patented Dec. 24, 1889.

Witnesses
M. Fowler

Inventor
Samuel Sturgis

By his Attorneys

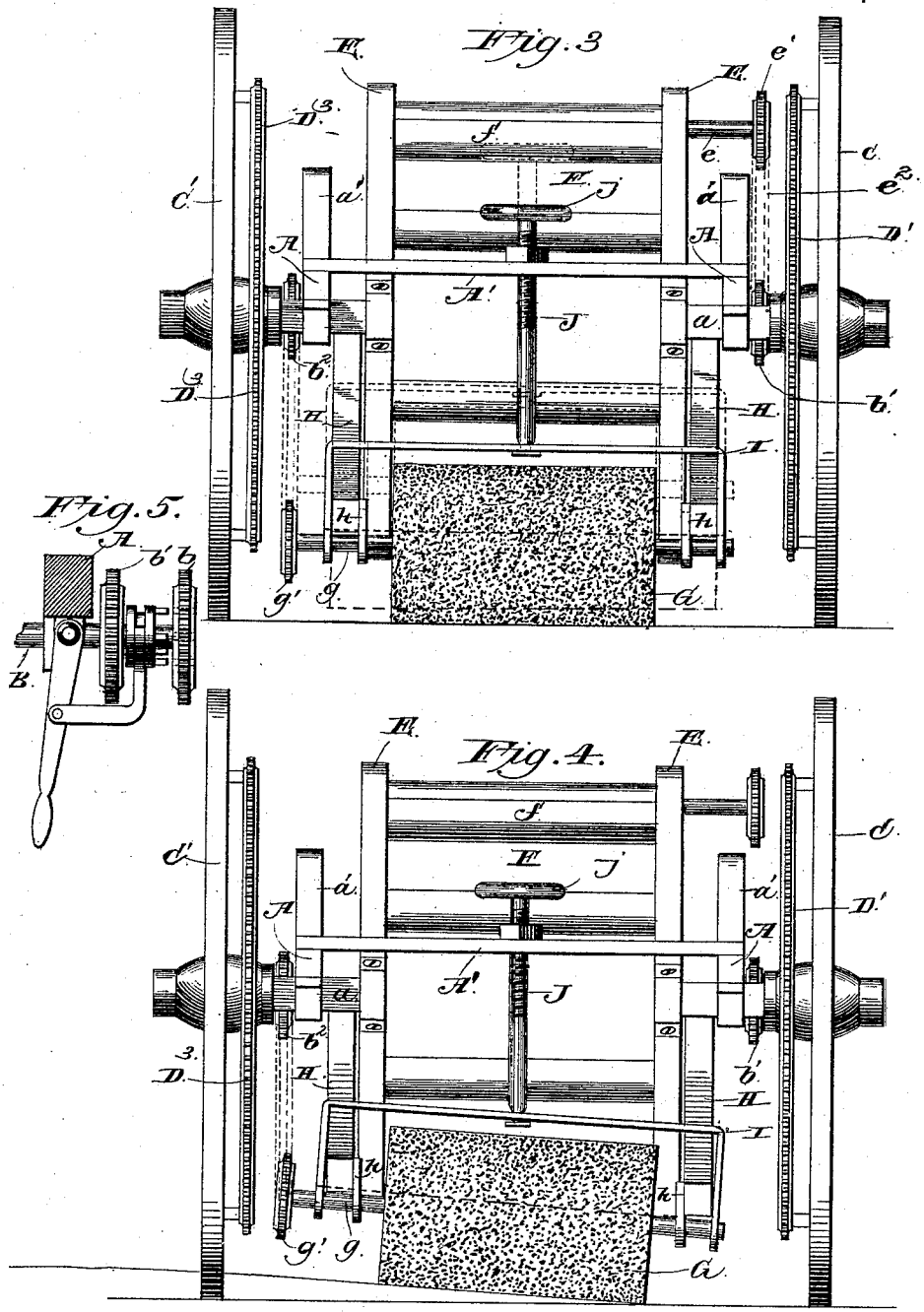

UNITED STATES PATENT OFFICE.

SAMUEL STURGIS, OF WEST MANAYUNK, ASSIGNOR TO THE MONTGOMERY MANUFACTURING COMPANY, OF PHILADELPHIA, PENNSYLVANIA.

STREET-SWEEPING MACHINE.

SPECIFICATION forming part of Letters Patent No. 418,143, dated December 24, 1889.

Application filed July 24, 1888. Serial No. 280,887. (Model.)

*To all whom it may concern:*

Be it known that I, SAMUEL STURGIS, a citizen of the United States, residing at West Manayunk, in the county of Montgomery and State of Pennsylvania, have invented a new and useful Improvement in Street-Sweeping Machines, of which the following is a specification.

This invention relates to street-sweeping machines; and it consists in the peculiar construction and the combination of parts, which hereinafter will be more fully described and claimed, and shown in the accompanying drawings, in which—

Figure 1:
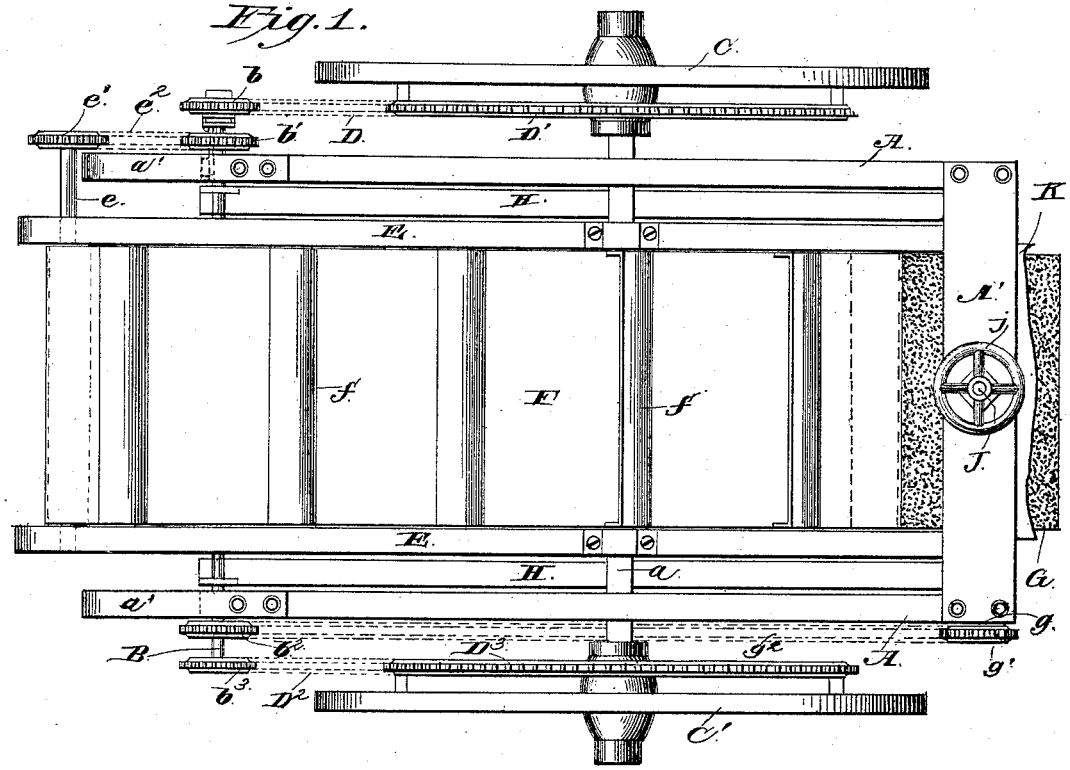
Figure 2:
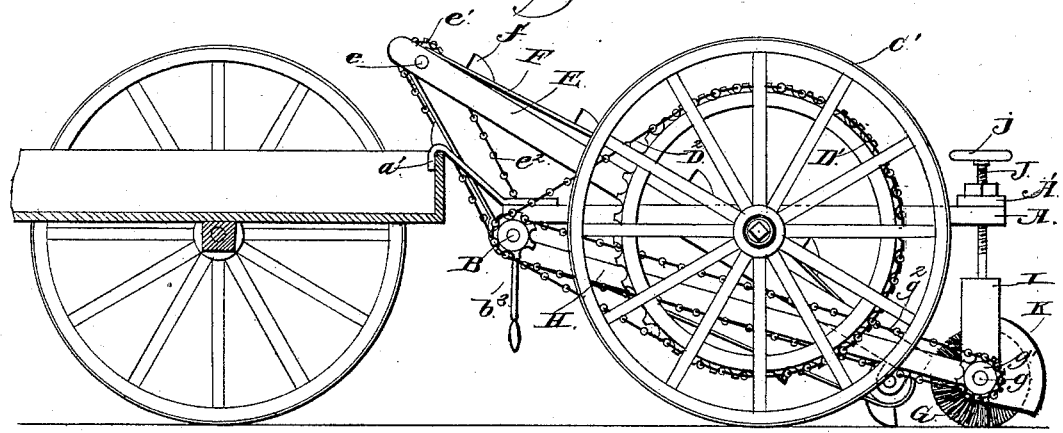

Figure 1 is a plan view of a sweeper embodying my invention. Fig. 2 is a side view, parts being broken away, of the sweeper, showing it attached to a cart or other vehicle by which it is drawn forward. Fig. 3 is a rear end view showing the adjustment of the brush by dotted lines, the brush-feeder being removed. Fig. 4 is a like view showing the adaptation of the brush to the pitch of the street. Fig. 5 is a detail view of the clutch.

The frame composed of the side bars A and the end cross-bar A' is provided with the axle $a$ midway of its ends, on which the drive-wheels C and C' are loosely mounted, to revolve independently of one another, and with the hooks $a'$, which are secured to the front ends of the side bars, and are adapted to engage with the cart or other vehicle to which it is desired to attach the sweeper. The shaft B, journaled in suitable bearings provided at the end of the side bars A, has two sprocket-pinions at each end, the sprocket-pinions $b$ and $b'$ being at one end and the sprocket-pinions $b^2$ and $b^3$ being at the other end of the said shaft. The sprocket-chain D connects the sprocket-pinion $b$ with the sprocket wheel or rim D', made fast with the drive-wheel C, and the sprocket-chain $D^2$ connects the sprocket-pinion $b^3$ with the sprocket rim or wheel $D^3$, secured to the drive-wheel C'.

The elevator-frame, composed of the bars E E, is secured to the axle $a$ midway of its ends, and inclines to a horizontal plane. The carrier, comprising the endless belt or apron F, having the transverse buckets $f$, is supported at its ends on suitable rollers, which are journaled in the ends of the bars E E. The journal $e$ of the upper roller is extended and provided with the sprocket-pinion $e'$, which is connected with the sprocket-pinion $b'$ by the sprocket-chain $e^2$.

The brush G, of ordinary construction, is journaled at its ends in hanger $h$, attached to bars H H, which are loosely supported at their front ends on the shaft B, and has the sprocket-pinion $g'$ on the end of its journal $g$, connected with the sprocket-pinion $b^2$ by the sprocket-chain $g^2$. The yoke I, having the journals of the brush passing through its ends, is supported midway of its ends by the set-screw J, which passes through the end bar A' of the frame, and has a loose connection with the said yoke. The set-screw is screwed in the bar A', and is provided with the hand-wheel $j$, by which it can be turned to raise or lower the brush. The fender K, a half-round piece of sheet metal, is carried by the yoke, and is adapted to cover the rear half of the brush and prevent it throwing the sweepings in the rear of the machine.

In practice the sweeper is attached to a cart or other vehicle by means of the hooks, which are fitted over the end-gate, the said cart or vehicle forming a receptacle for the sweepings, which are delivered therein by the elevator, which is sufficiently long to extend some distance over the end-gate, so as to insure the whole delivery of the sweepings in the said receptacle. As the sweeper is drawn forward, the shaft B will be rotated from the drive-wheels by the gearing hereinbefore described, and will communicate motion to the elevator and to the brush by the means already referred to. The brush sweeps the dirt on the elevator, which carries the dirt up and delivers it in the said vehicle. The brush, being free to rise and fall at either end by reason of the loose connection of the hanger-bars with the shaft B and by the yoke being supported solely at its middle, will adapt itself to any inequalities or irregularities in the street and to any degree of lateral pitch which the street may have, thus performing its work in an efficient and satisfactory manner. By adjusting the set-screw the brush can be lowered to compensate for wear, or can be raised when it is desired not to have it perform any work.

The machine can be thrown in and out of gear by a suitable clutch arranged on the shaft B.

Having described my invention, I claim—

1. The combination of the main frame, mounted upon the axle and having a transverse shaft at one end, the hanger-bars mounted loosely upon said shaft, a revolving brush journaled at the free ends of said bars, a set-screw extending through a transverse bar of the main frame, and a yoke swiveled at the lower end of said set-screw and having bearings for the revolving brush, substantially as set forth.

2. The combination of the main frame, a transverse shaft at one end of the same, the hanger-bars mounted loosely on said shaft, the brush journaled at the free ends of said bars, the elevator-frame mounted upon the axle of the machine between the sides of the main frame, the endless carrier, the set-screw extending vertically through the main frame, the yoke swiveled at the lower end of the set-screw and having bearings for the revolving brush, and mechanism for communicating motion to the latter and to the endless carrier from supporting-wheels mounted loosely upon the axle, substantially as set forth.

3. The combination of the axle, the main frame mounted thereon and having a transverse shaft at one end, the bars mounted loosely on said shaft, the revolving brush journaled at the free ends of said bars, the elevator-frame mounted upon the axle between the sides of the main frame, the set-screw extending vertically through the latter, a yoke swiveled at the lower end of said set-screw and having bearings for the revolving brush, the fender mounted upon said yoke, the endless carrier, and mechanism for conveying motion to the latter and to the brush from the supporting-wheels of the machine, substantially as set forth.

In testimony that I claim the foregoing as my own I have hereto affixed my signature in presence of two witnesses.

SAMUEL STURGIS.

Witnesses:
 JOSEPH PRICE,
 HOMER PARSONS.